(12) United States Patent
McGee

(10) Patent No.: US 6,596,142 B2
(45) Date of Patent: Jul. 22, 2003

(54) ELECTRO-THERMAL DYNAMIC STRIPPING PROCESS

(75) Inventor: Bruce C. W. McGee, Calgary (CA)

(73) Assignee: McMillan-McGee Corporation, Calgary (CA)

( * ) Notice: Subject to any disclaimer, the term of this patent is extended or adjusted under 35 U.S.C. 154(b) by 0 days.

(21) Appl. No.: 09/815,968

(22) Filed: Mar. 22, 2001

(65) Prior Publication Data
US 2002/0013508 A1 Jan. 31, 2002

Related U.S. Application Data
(60) Provisional application No. 60/191,385, filed on Mar. 22, 2000.

(51) Int. Cl.[7] .................................................. B09C 1/06
(52) U.S. Cl. ................... 204/515; 588/204; 405/128.85
(58) Field of Search ........................ 204/515; 588/204; 405/128.85

(56) References Cited

U.S. PATENT DOCUMENTS

| | | | |
|---|---|---|---|
| 5,330,291 A | 7/1994 | Heath et al. ................. 405/128 |
| 5,449,251 A | 9/1995 | Daily et al. .................. 405/128 |
| 5,656,239 A | 8/1997 | Stegmeier et al. ............ 422/32 |
| 5,907,662 A | 5/1999 | Buettner et al. ............. 392/301 |
| 5,975,799 A | * 11/1999 | Carrigan et al. ............. 405/128 |
| 5,994,670 A | 11/1999 | Buettner ..................... 219/213 |
| 6,004,451 A | * 12/1999 | Rock et al. .................. 204/515 |
| 6,086,739 A | * 7/2000 | Hodko ........................ 204/515 |

FOREIGN PATENT DOCUMENTS

JP 2000-84535 * 3/2000

* cited by examiner

Primary Examiner—Arun S. Phasge
(74) Attorney, Agent, or Firm—Marsh Fischmann & Breyfogle LLP

(57) ABSTRACT

A process is provided for vaporizing volatile contaminants present in soil and removing the contaminant vapors. The process involves heating the soil by passing current between electrodes buried in the soil and simultaneously injecting water through the electrodes to transfer heat by convection. The coupling of electrical heating with heat transfer by convection improves the efficiency and uniformity of heating. The contaminant vapors are removed by applying suction at extraction wells positioned between the electrodes.

25 Claims, 15 Drawing Sheets

- EXTRACTION WELL
- ELECTRODE

NOT ALL VAPOR EXTRACTION WELLS ARE SHOWN

ALTERNATING CYCLES OF HOT & NEUTRAL ELECTRODES

FIG. 10a
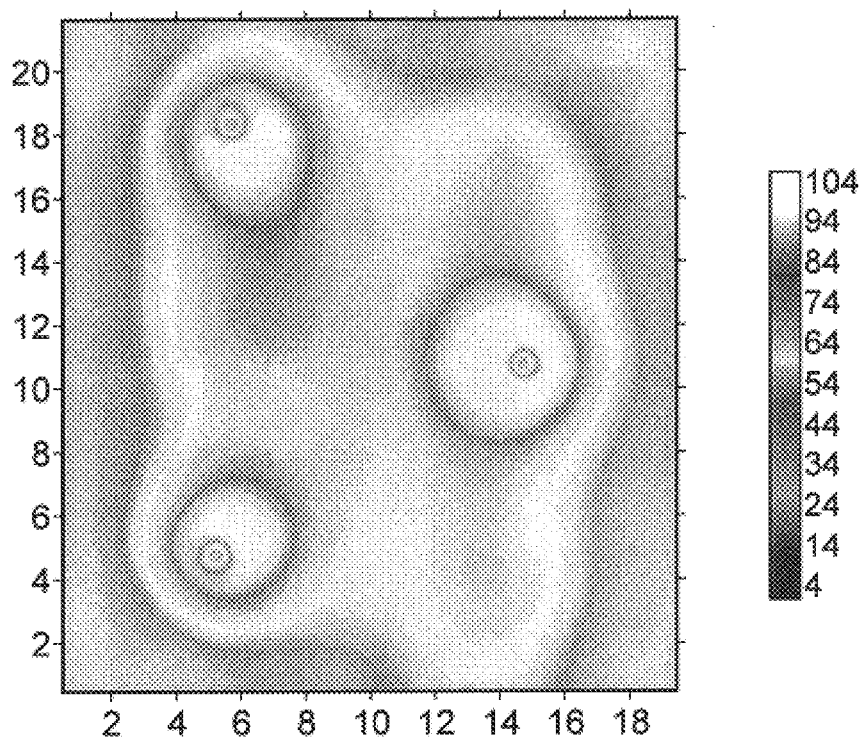
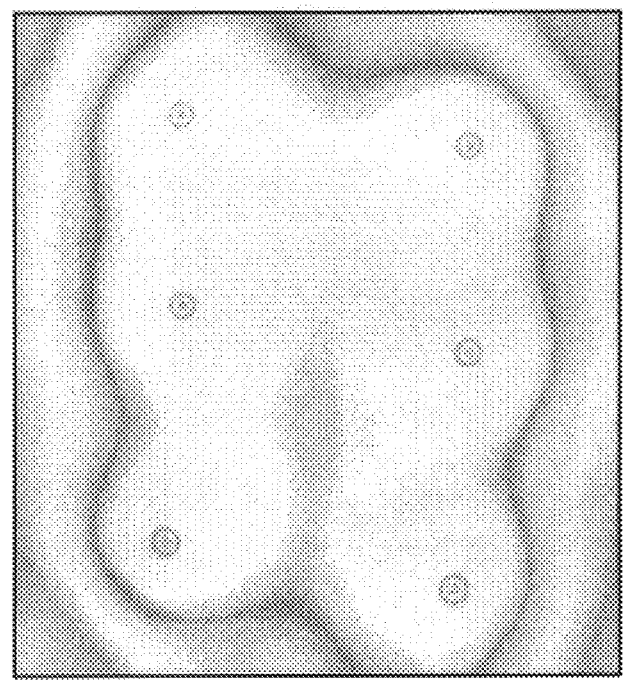
FIG. 10b

Temperature Distribution Using the ET-DSP Process After 90 Days of Heating at an Average Power of 110kW VAPOR EXTRACTION WELLS NOT SHOWN.
COLUMNS OF ELECTRICAL INJECTION WELLS ARE
9 METRES APART AND ROWS ARE 7 METRES APART.
AVERAGE TEMPERATURE IS 72°C, AN INCREASE OF 69°C.

Temperature Distribution Using the ET-DSP Process After 120 Days of Heating at an Average Power of 110kW VAPOR EXTRACTION WELLS NOT SHOWN. FROM 90 TO 120 DAYS THE INJECTION RATE INTO THE ELECTRODE INJECTION WELLS IS INCREASED BY 50% TO ACCELERATE THE DYNAMIC STRIPPING OF CONTAMINANT FROM THE SOIL. THE AVERAGE TEMPERATURE OF THE SOIL INCREASES TO OVER 85°C.

ELECTRO-THERMAL DYNAMIC STRIPPING PROCESS

CROSS-REFERENCE TO RELATED APPLICATIONS

This application claims priority under 35 U.S.C. §119 to prior-filed U.S. Provisional Patent Application No. 60/191,385 entitled "Electo-Thermal Dynamic Stripping Process, filed Mar. 22, 2000, the entire contents of which are set forth herein as if set forth herein in full.

FIELD OF THE INVENTION

The invention relates to a process and apparatus for introducing heat into contaminated soil to vaporize and remove volatile contaminants. The process utilizes spaced apart electrodes penetrating the soil. Electric current is passed between the electrodes to heat the soil and the contaminants. The vaporized contaminants are recovered from the soil through vapor extraction wells.

BACKGROUND OF THE INVENTION

Contaminated soils are a matter of national concern. Many contaminants have the ability to flow into aquifer systems, thereby contaminating the public water supply. The depth at which some contaminants occur renders the use of excavation prohibitively expensive. It is therefore desirable to have a method that can effectively remove the contaminants in-situ, where depth is not a factor.

It is known to use electricity to heat soil. This has been practiced in connection with heating subterranean heavy oil reservoirs, to reduce the viscosity of the oil so it can be recovered. It has also been used in the environmental field to heat contaminated soil To vaporize contaminants, which are subsequently extracted from the soil. The present invention is concerned with this latter application of electrical heating.

In general, the known scheme used involves:
  providing spaced apart electrode wells having tubular electrodes penetrating the soil to be heated;
  causing current to pass through the soil from one electrode to the other—the current moves through conductive connate or indigenous moisture in the soil and heats the resistive soil at the same time, with the result that volatile contaminants in the soil vaporize; and
  providing vacuum or suction extraction wells between the electrode wells; and
  applying suction to some or all of the extraction wells, to extract the vaporized contaminants from the soil.

In these operations, it is common to use current directly from the local power system, which is normally delivered at 60 Hz.

In greater detail, heat enhances the remediation of contaminated soils in-situ. It does this by increasing the vapor pressure of volatile organic compounds and semi-volatile organic compounds, increasing the solubility of contaminants in the water phase, accelerating the growth rate of bacteria involved in bio-remediation strategies, and decreasing the time required to achieve natural attenuation (natural degradation process of contaminants within the soil).

FIG. 1 shows the vapour pressure relationship for benzene ($C_6H_6$), a component often involved in contaminated soils. The curve represents the phase boundary of benzene. Above the curve, benzene naturally exists in liquid phase; below the curve it exists in the gas phase. An increase in temperature from standard conditions of 15° C. to 80° C. changes the phase of benzene from liquid to gas at atmospheric pressure. The average pressure in the soil can be reduced to one third of an atmosphere as a result of vacuum applied at the extraction wells. As indicated in FIG. 1, at this pressure the temperature needs only to exceed 50° C. for benzene to go into the gas phase. Once the contaminant is in the gas phase, it can be recovered from the soil at the extraction wells.

As mentioned, methods have been proposed that use electrical energy for heating in combination with suction extraction through "wells" to remove volatile organic compounds from the contaminated soil. For electrical heating to be effective, the heat distribution through the contaminated soil should be uniform and achieved in as short a time as possible. The present process and apparatus incorporate features which enhance efficient and uniform soil heating.

SUMMARY OF THE INVENTION

The present invention provides process and apparatus for electrically heating contaminated soil. This may be done simply to raise the temperature of the soil, for example to mobilize contained viscous oil so that it may drain into a recovery pit. Preferably it is done so as to raise the temperature of soil and contaminants in the soil sufficiently, so that volatile contaminants are vaporized and can be removed from the soil.

One preferred and specific embodiment of the invention comprises:
  Providing spaced apart, tubular electrode wells having electrodes penetrating the contaminated soil. The electrode wells are arranged in a pattern (for example, parallel spaced rows) which defines a region or volume of contaminated soil to be heated;
  Providing tubular perforated extraction wells penetrating the defined soil region. These extraction wells are connected with means, such as a vacuum pump, for applying suction to remove vapors and/or liquids from the soil region. The extraction wells are located between the electrode/injection wells and create low pressure sinks;
  Each electrode comprises a length of conductive pipe having apertures or openings extending through the pipe side wall over intervals at the top, middle and bottom. Each electrode well further comprises means for conveying pumped water from ground surface into the electrode and injecting it under pressure into the contaminated soil through the top and bottom openings. The electrode well further has return conduit means for returning water to ground surface from the middle openings. By means of this arrangement, one part of the water introduced through the electrode can be circulated along the electrode and returned through the middle openings, thereby cooling the electrode and the soil at the electrode ends, where current density is concentrated. In addition, another part of the water can be injected and moved radially out into the region of soil to conduct heat convectively toward the extraction wells;
  The proportions of water circulated to cool the electrode and adjacent soil at each end of the electrode and water injected outwardly into the contaminated soil, can be controlled by throttling the return conduit means;
  Multi-phase alternating current is applied to the electrodes to induce flow of current between electrodes, thereby heating contaminated soil; and
  Suction is applied to the extraction wells to recover contaminants in vapor and/or liquid form.

One broad process aspect of this embodiment of the invention therefore comprises: electrically heating a region of soil bound or defined by spaced electrodes, by passing current between the electrodes; and injecting water under pressure into the soil at the electrodes to transfer heat by convection out into the soil region and toward the extraction wells. Preferably, water injection is conducted simultaneously.

Preferably, heating is conducted by this process of coupling electrical heating with heat transfer by convection to raise the temperature of the soil region sufficiently to vaporize contained contaminants. These vaporized contaminants are then removed through extraction wells positioned between the electrodes.

This process aspect addresses the following problem. The power density in watts per cubic meter decreases from a single electrode as the inverse of the radius raised to the second power. Otherwise stated, electrical heating of soil decreases dramatically as the distance from the electrode increases. Water, injected at the electrode, can function to absorb heat adjacent the electrode and carry it out into the further reaches of the soil region, where it is transferred to the cool soil. In this way, the rate of increasing the temperature of the soil region is improved.

Another preferred feature of the embodiment previously described is that the circulation of cooling water is initiated through the soil at the ends of the electrode, where current density is concentrated. If this is not done, there is a possibility that moisture in the soil at the electrode ends will evaporate, reducing the conductivity in those zones. By cooling these zones with water, this problem is mitigated and current can more uniformly flow from the entire electrode and more power can be input to the electrode.

In another broad aspect of the previously described preferred embodiment;

water is injected into the soil through the openings at each end of the electrode and part of it is returned to ground surface through the middle openings, thereby cooling both the electrode and the adjacent soil at the ends of the electrode;

thermocouples can be mounted at each end of the electrodes to monitor temperature; and throttling of the water return conduit can be applied in response to the measured temperatures, to ensure that cooling is adequate.

In an apparatus aspect of the previously described embodiment, there is provided an electrode well for penetrating into contaminated soil from ground surface and enabling simultaneous introduction of electrical current into the soil, injection of water into the soil and return of externally circulated cooling water, comprising a tubular conductive electrode having a side wall forming short intervals of openings at the top, middle and bottom of the electrode, the electrode having an internal bore comprising top, middle and bottom portions; first conduit means, extending into the top portion of the bore, for supplying water to the top openings; second conduit means, extending into the lower portion of the bore, for supplying water to the bottom openings; third conduit means, extending into the middle portion of the bore, for returning water, entering through the middle openings to ground surface; means for sealing the bore top portion from the middle portion; means for sealing the bore middle portion from the bottom portion; and means for delivering power to the electrode.

In a preferred apparatus feature, the electrode is provided with electrically isolated end caps. The function of the caps is to ensure that current flow from the ends is minimized and that the current is directed radially from the electrode into the contaminated soil. If the end caps are not electrically isolated, current would preferentially flow from the ends into regions or zones that could not be effectively cooled, resulting in hot spots above and below the electrode. As the region adjacent each electrode end increases in temperature, it becomes less and less resistive. Consequently, more of the current, taking the path of least resistance, will flow from the ends of the electrode and not radially into the contaminated soil where heating should occur. The provision of electrically isolated end caps alleviates this problem.

In another preferred aspect of the invention, the voltage and phase distribution between electrodes are controlled and varied so that electrical current is forced to flow as uniformly as possible through the soil region, even though the soil region is characterized by heterogeneous electrical properties. This feature is most advantageously used with vertical stacking of two or more electrodes, as described below.

In another preferred aspect, the quantity of power to each electrode is controlled. As a result, increased power can be delivered to the contaminated soil during heating operations using a method herein referred to as Time Distributed Power Control. This involves adjusting the input power to an electrode by varying the number of cycles of voltage applied to the electrode over an interval of time. Time Distributed Power Control ("TDC") is used in combination with Inter-Phase Synchronization. Inter-Phase Synchronization ("IPS") involves the application of specific phases of 3-phase AC power to specific electrodes over an interval of time and then changing the phases applied to the electrodes over subsequent intervals of time. When TDC and IPS are used in combination, more power can be inputted into the contaminated soil as it is possible to have up to all of the electrodes conducting current at any given moment. This process can, subsequently, heat the soil faster and more efficiently.

In another preferred aspect, the electrode wells and extraction wells are arranged in a pattern that is adaptable to the shape of the contaminated soil deposit. This pattern has the flexibility to increase the number of electrodes in the pattern with as few as a single electrode. Also the positions of the electrode and extraction wells enable creating pressure distribution in the soil, with an array of pressure sinks at the extraction wells and pressure sources at the electrode wells. This encourages effective recovery of contaminants and facilitates uniform heat transfer by convection. More particularly, the pattern involves placing the electrodes in a row and column configuration with the electrodes spaced a sufficient distance apart to enclose the region of soil to be treated. Different phases of power are applied to different electrodes to cause current to flow from any one electrode to its adjacent electrodes, uniformly heating the region of soil. By introducing TDC into the process, the power applied to an electrode may be individually controlled. When using TDC in combination with IPS, the phases of power applied to individual electrodes may be alternated to re-orient the flow of current among the electrodes as required to uniformly heat the entire region of contaminated soil.

BRIEF DESCRIPTION OF THE DRAWINGS

FIGS. 10(a) and 10(b) are isotherm plots developed by numerical modelling, showing a comparison of the temperature distribution resulting from alternating the current to six electrodes in a pattern of wells in accordance with the prior art, and that achieved using Time Distributed Power Control and Inter-Phase Synchronization;

DESCRIPTION OF THE PREFERRED EMBODIMENT

Concepts

Figure 1:
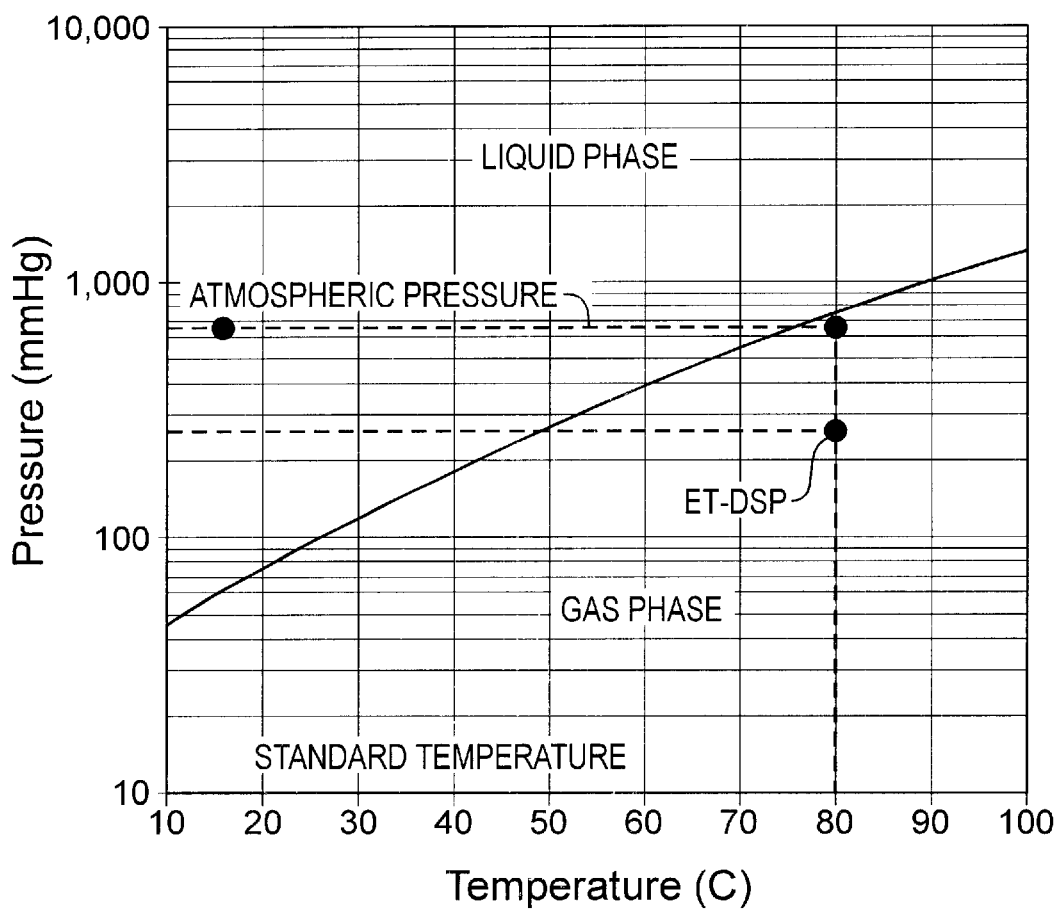
FIG. 1 is a plot showing the phase behavior of benzene and demonstrates how an increase in temperature results in an increase in the vapor pressure.

The heating of soil using electrical heating and heat transfer by thermal conduction is an inherently limiting process. To achieve any degree of uniform heating will require densely spaced electrodes. The limitations of this approach can be shown by inspection of the conservation of energy equation for a process that is limited to heating by electrical heating and thermal conduction:

$$\nabla \cdot (\lambda \nabla T) + \Gamma \frac{I^2 1}{\sigma, r^2} = \frac{\partial}{\partial t}(\rho C_f T)$$

Electrical heating brings about the increase in temperature anywhere in the spatial domain, which is expressed by the second term in the above equation. Heat transfer by thermal conduction which is expressed by the first term, does not transfer heat very effectively, especially in soils, which have a relatively small coefficient of thermal conductivity. Closer inspection of the electrical heating term shows that the power density in watts per cubic meter decreases from a single electrode as the inverse of the radius raised to the second power. Thus a distance of four radii from the electrode would result in only a fraction (one sixteenth) of the power density available for heating the soil.

Our approach to overcome these limitations involves introducing convection to more effectively transfer heat into the soil from the electrode. The effectiveness of the combined heat transfer process can be shown by inspection of the following energy conservation equation that also includes heat transfer by convection:

$$\nabla \cdot (\lambda \nabla T) + \nabla \cdot (\rho C_f \bar{u}_f T) + \Gamma \frac{I^2 1}{\sigma, r^2} = \frac{\partial}{\partial t}(\rho C_f T)$$

The second term in the above equation accounts for convection. The transfer of heat by convection depends on the velocity, $\bar{u}_f$, and temperature, T, of the fluids. The highest temperatures in the spatial domain are normally located at the electrodes, and by proper design of the pattern of electrode and extraction wells, the flow velocity term, $\bar{u}_f$ can be made comparatively uniform within the soil. Consequently, the resulting temperature distribution is relatively uniform, and much more so than in comparison with just electrical heating and heat transfer by conduction.

Soil is heterogeneous. For example, the electrical conductivity of soil can vary dramatically with depth as the dissolved electrolyte concentration changes. Since current takes the path of least resistance it is important to know the electrical properties to heat the desired volume of soil. Otherwise expensive electrical energy could be wasted in regions that do not require heating. The electrical properties of various bands making up the region of soil can be determined by cutting and recovering cores of the soil and analyzing them for their properties.

Once the electrical properties of the soil are known, it is possible to control or adjust the voltage and phase distribution between individual electrodes to cause or force current to flow into less conductive portions of the region of soil to be heated. This approach normally incorporates the use of vertically stacked electrodes in each electrode/injection well.

Figure 2:
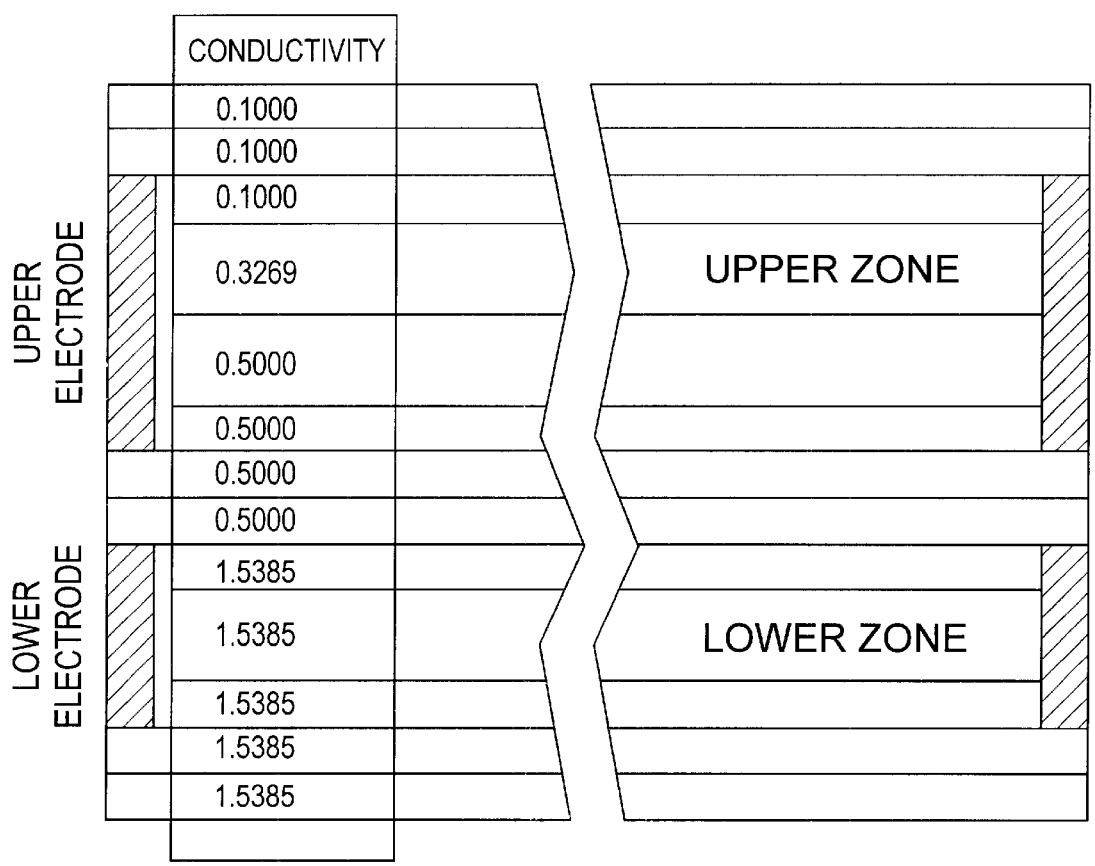
FIG. 2 is a cross-section of a region of soil, showing a configuration of two layers of soil with varying vertical electrical conductivity. Stacked electrodes are shown, positioned in a lower conductivity upper zone and a higher conductivity lower zone. The Figure is used herein to assist in describing the implementation of Inter-Phase Synchronization, by means of which both the upper and lower zones can be preferentially heated.

This system is referred to herein as Inter-phase Synchronization. To illustrate this concept, refer to FIG. 2. In this example, it is desirable to heat the upper and lower zones. The lower zone is much more conductive than the upper zone. Consequently if a voltage gradient were created between the two upper electrodes, current would flow out of the upper zone and into the lower zone and the desired result of heating the upper zone would not be achieved. On the other hand, if a voltage gradient were created between the two lower electrodes, current would preferentially flow in the lower zone and the desired heating would be achieved. How is it possible to achieve heating in both the upper and lower zones? Using Inter-phase Synchronization the system can establish instantaneous voltage gradients between the lower and upper electrodes. In this example a voltage gradient can be momentarily set up between the upper electrode on the left and the lower electrode on the right. Under this condition, the current would tend to flow in the upper zone down towards the lower zone. Since the resistance of the upper zone is greater, preferential heating should be achieved in the upper zone near the upper left electrode. At some time later, a voltage gradient could be set up between the upper right electrode and the lower left electrode. The reverse of the previous condition would exist and preferential heating of the upper zone towards the upper right electrode can be achieved. These two conditions make possible the preferential heating of the upper zone. At a subsequent time, the voltage gradient and phase between the two lower electrodes is established so that preferential heating of the lower zone is achieved. These conditions can be sequenced during heating operations at time intervals from a fraction of a second to several days, so that the overall desirable heating of both the upper and lower zones is achieved.

The ability to control power to a single electrode allows the system to operate at maximum capacity. In various electrical heating configurations, the input power to a single electrode cannot be easily controlled. Consequently, the maximum input power may be limited by the minimum power to one electrode (similar to a chain is only as strong as its weakest link) Also, the ability to control power to a single electrode makes it possible to expand the number of electrodes in a pattern by as few as one at a time. Time Distributed Power Control makes it possible to achieve single electrode power control. An additional advantage of using Time Distributed Power Control methods is that it meets all the IEEE 519-1992 requirements for harmonic control in electrical power systems, whereas other power control methods may require auxiliary electronic filtering to meet these requirements.

Time Distributed Control and Inter-Phase Synchronization

Figure 9:
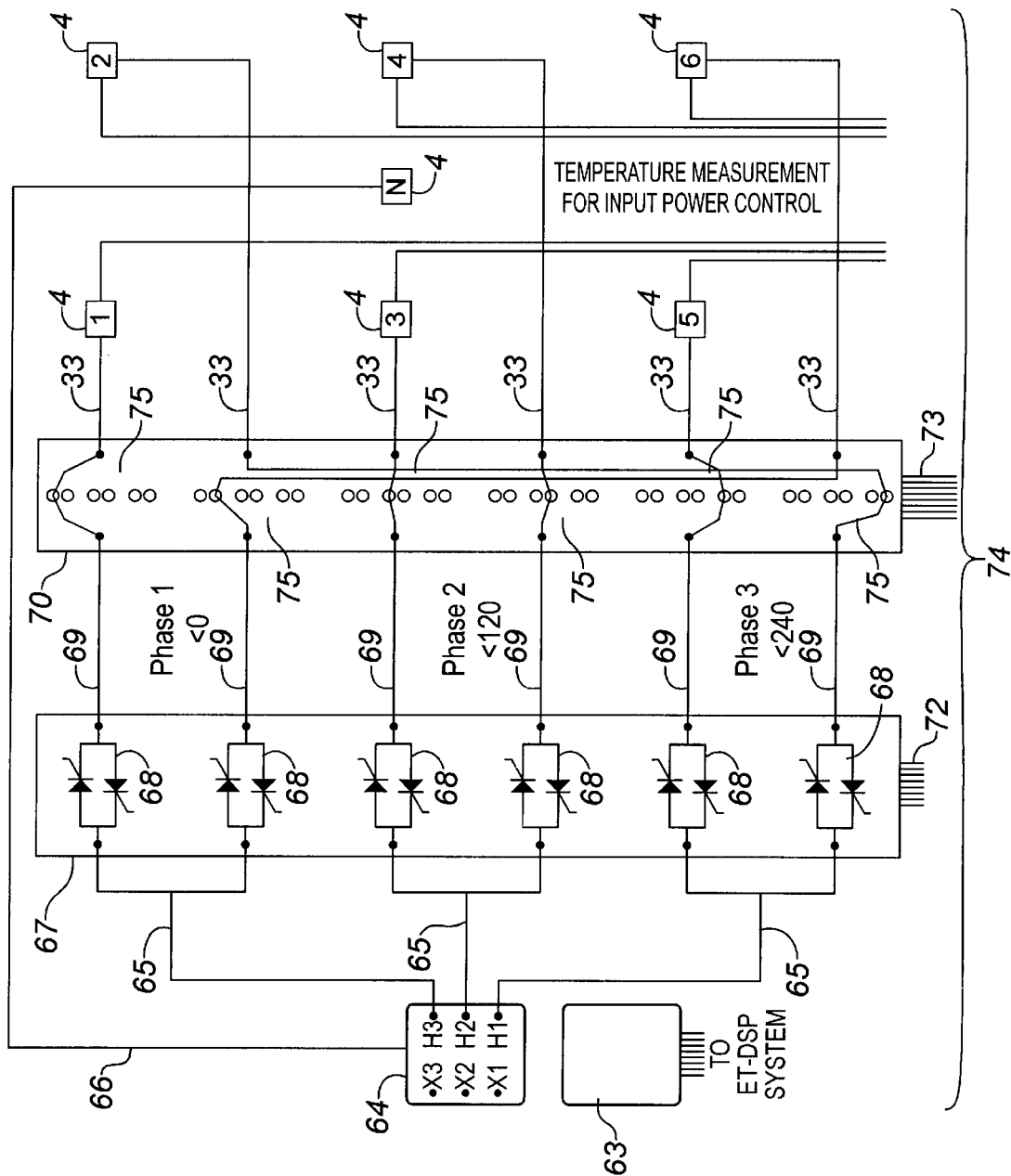
FIG. 9 is a schematic showing the implementation of Time Distributed Power Control and Inter-Phase Synchronization in accordance with the present invention.

FIG. 9 shows the implementation of Time Distributed Control and Inter-Phase Synchronization. This technology allows the implementation of distinctive power control at an electrode within a group of many, while simultaneously making it possible to optimize the current flow between electrodes by prudent placement of the phase of the voltage from a three phase Power Delivery System. The previous technology was limited to one electrode connected to one phase of three-phase Power Delivery System, or give up the ability to control the power to a distinctive electrode. The difference in the temperature distribution results between this technology and alternating the hots and neutrals between electrode pairs, as has been done in the past, is shown in FIG. 10. In both examples, the duration of heating is 120 days. The temperature distribution in the upper plot is irregular and less uniform than the temperature distribution shown in the lower plot. The advantages are:

1. More power can be input into the contaminated soil since all of the six electrodes (in this example) are conducting current and at no time is an electrode turned off, or sitting idle—can heat the soil faster.
2. The heat losses are less since the time to heat the soil to a desired average temperature is less.
3. The uniformity of the temperature distribution is improved since the phase of the voltage to an electrode can be changed to optimize the heating during operations.

Figure 6:
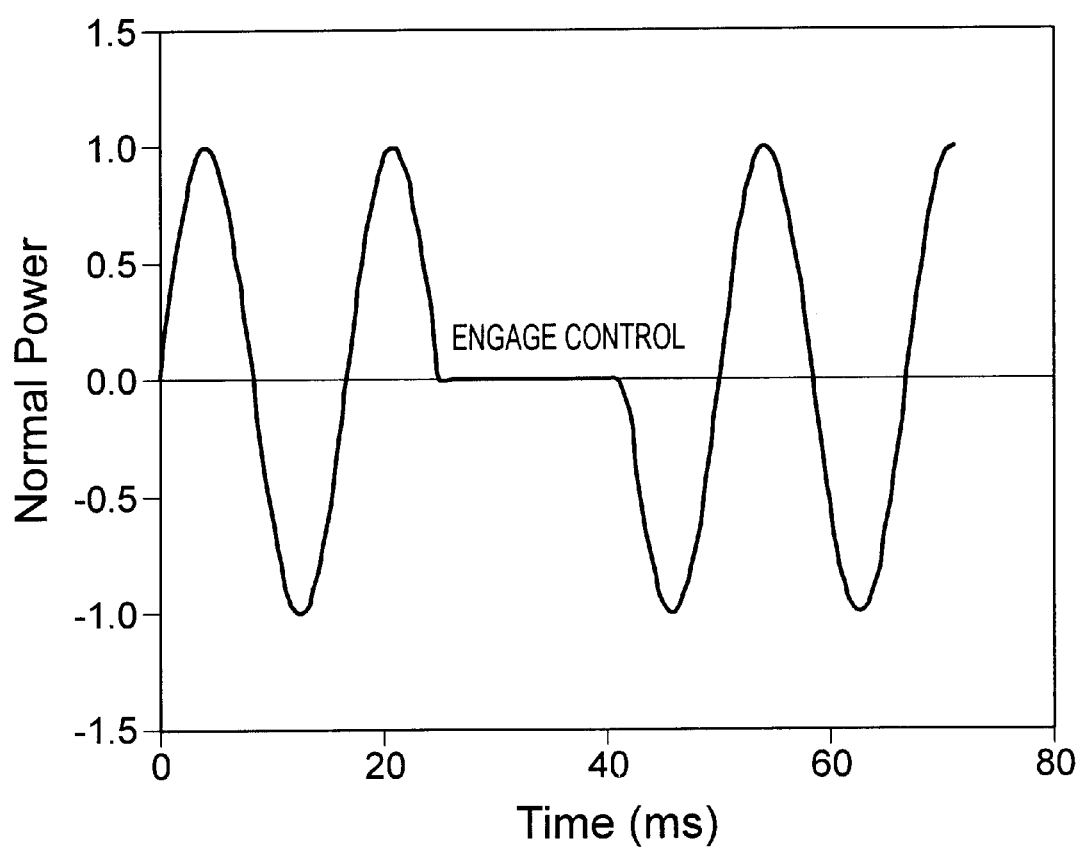
FIG. 6 is a plot showing the normalized voltage waveform undergoing Time Distributed Power Control. This is the method developed for power control to each electrode in the present process.

Time Distributed Control is achieved using single-phase, zero-cross, silicon controlled rectifier (SCR) module technology in combination with a Computer Controller. The Computer Controller adjusts the input power levels based on the temperature of the soil. A signal is sent to the SCR module that is interpreted as the desired power level. The SCR module then determines the number of cycles of voltage to eliminate from the voltage source in order to achieve the desired power level as shown in FIG. 6. The resolution of power control is less than 1%.

The Inter-Phase Synchronization is achieved through similar hardware, using SCR or Contactor technology, to replace mechanical switches. The phase that is applied to an electrode in relation to the phase of adjacent electrodes determines where the current will flow in the contaminated soil. In situations where the electrical conductivity of the soil varies significantly between electrodes or when the temperature distribution is non-uniform as a result of an irregular flow of fluids in the soil, the phase between electrodes can be changed to compensate for these effects and achieve uniform heating.

Current from a finite length electrode placed in the soil prefers to flow from the ends of the electrode. Consequently the power density and hence the heating rate will be greatest there. As the temperature of the soil increases, the electrical conductivity also increases. Measurements of soil electrical conductivity in the lab have shown that the electrical conductivity can increase by as much as a factor of four times over a temperature rise of 100° C. The increased conductivity at the ends of the electrode due to the increased temperature results in even more of the total current leaving the ends of the electrode. Since the power density is proportional to the square of the current, the net result is rapid overheating at the ends of the electrode, flow of current outside of the volume of soil to be preferentially heated, and reduction of the input power to the electrode to prevent overheating.

Figure 7A:
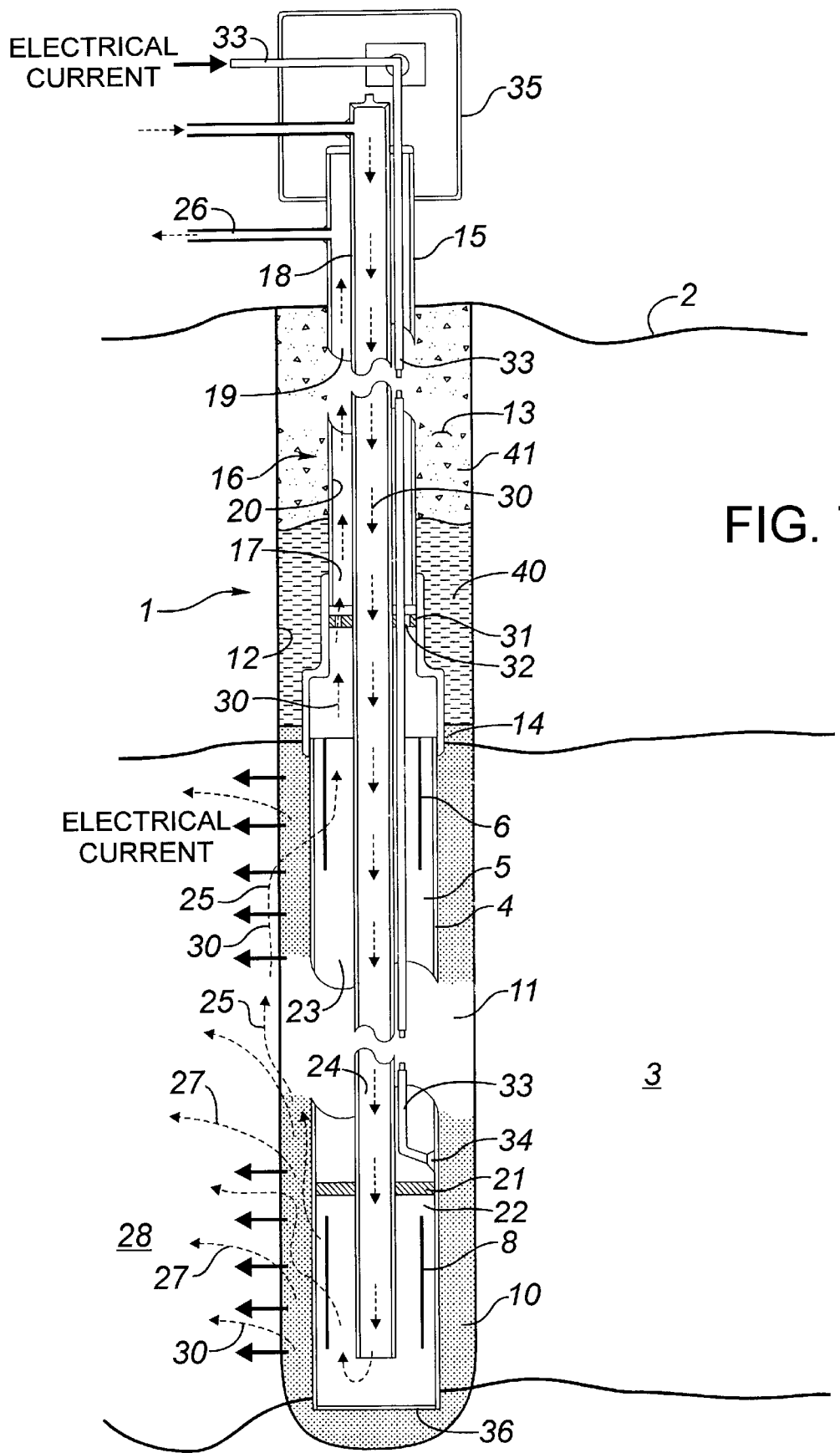
FIG. 7a is a cross-sectional side view of one embodiment of an electrode well in accordance with the invention.
Figure 7B:
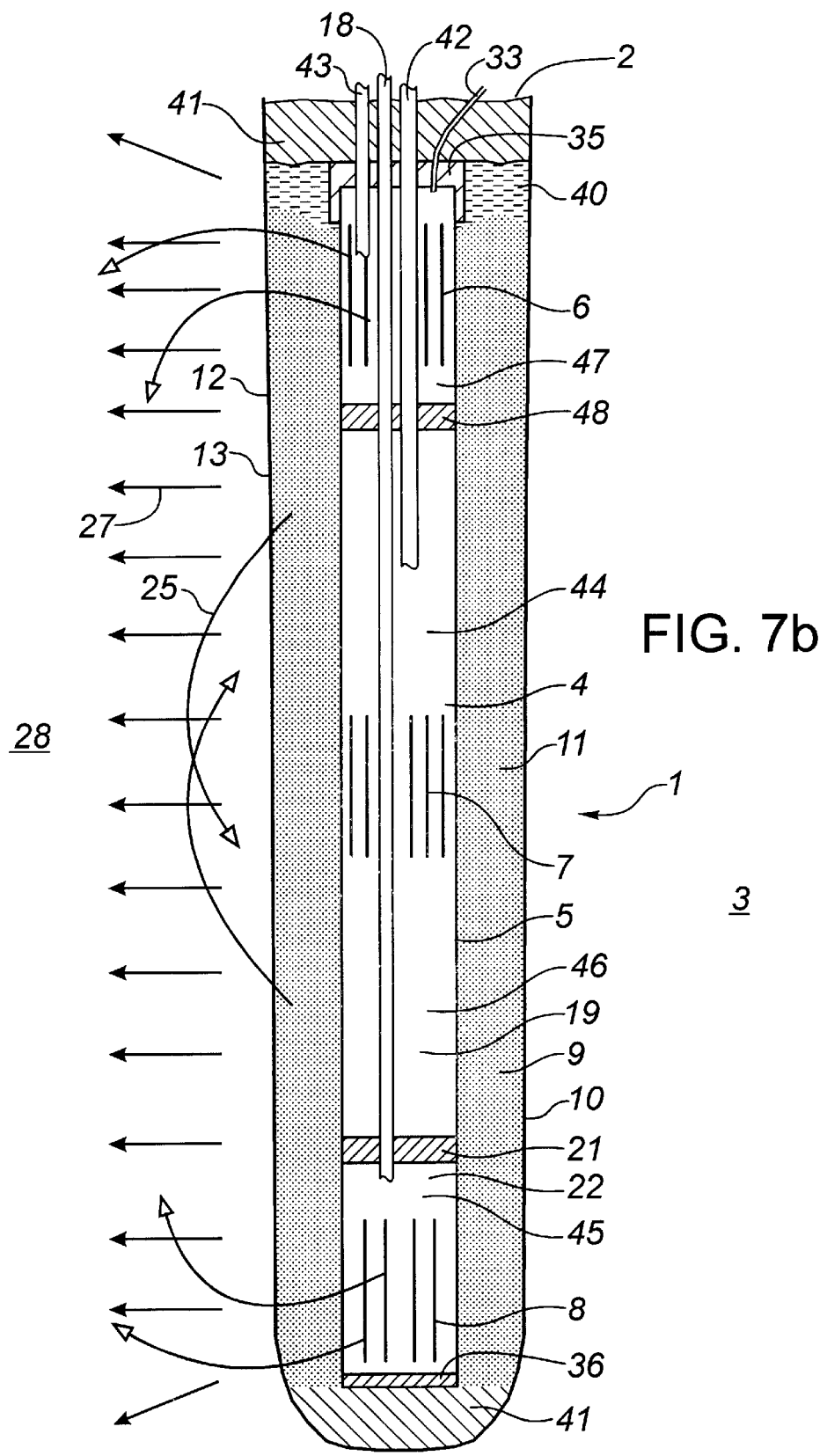
FIG. 7b is a cross-sectional side view of another embodiment of an electrode well in accordance with the invention.
Figure 8:
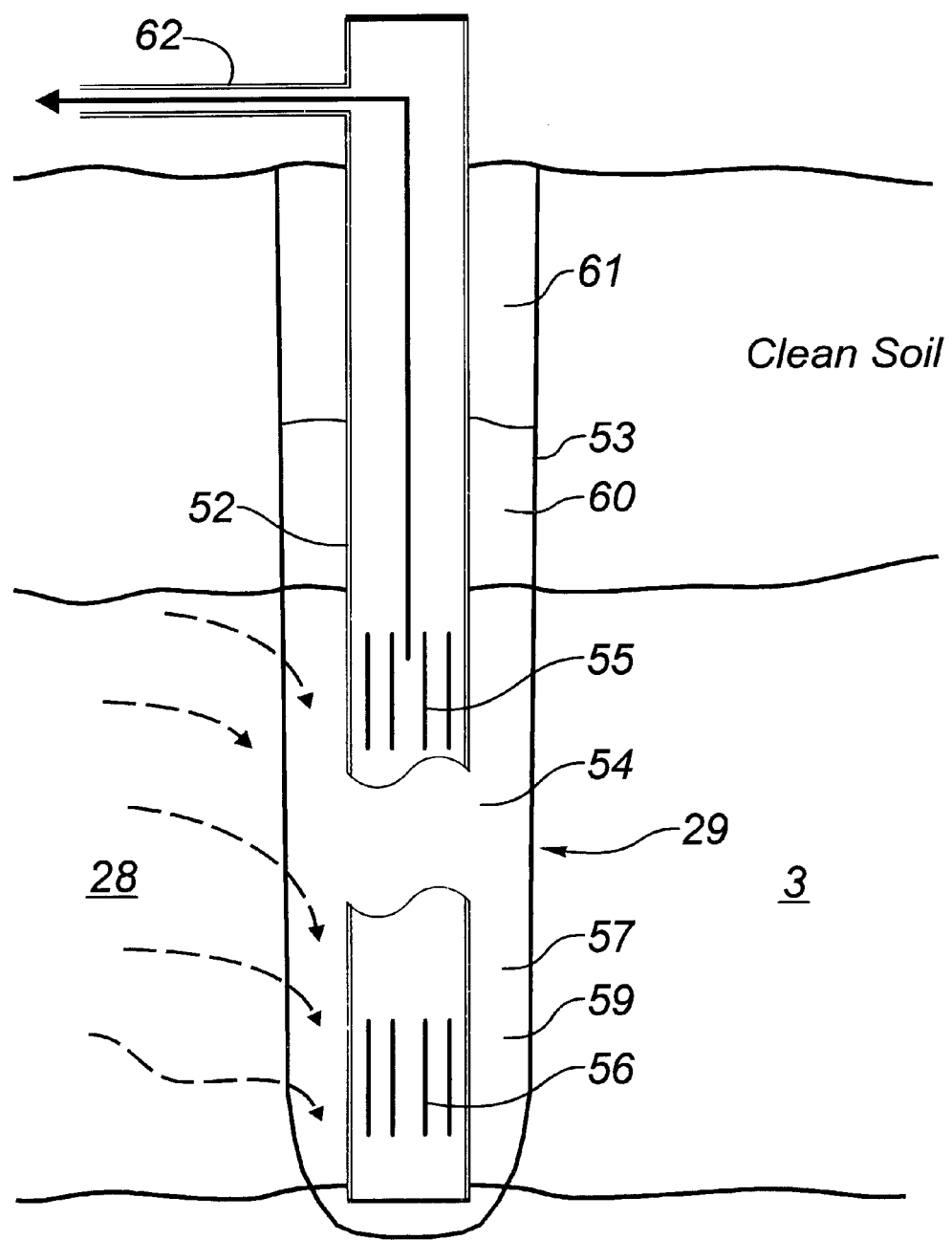
FIG. 8 is a cross-sectional side view of a vapor extraction well.

An injection electrode design has therefore been developed, as shown in FIGS. 7a, 7b, that facilitates rapid and controlled cooling at the ends of the electrode, where cooling is needed the most. Also, the design promotes the flow of fluid, usually water, into the soil and hence enhances heat transfer by convection. Fluid can be circulated back to the surface, which may be needed under certain soil conditions, such as with extremely low permeability clays, to maintain effective cooling of the electrode.

Figure 3:
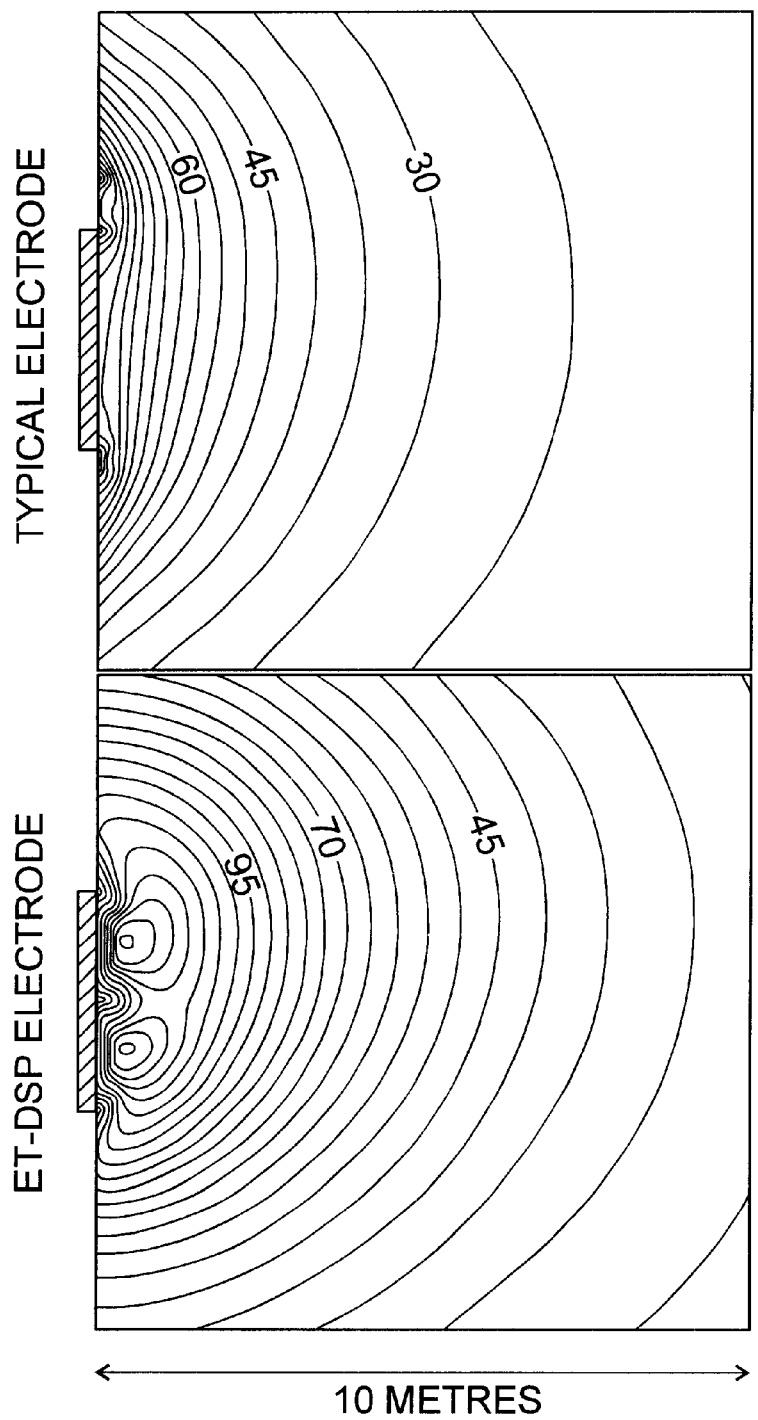
FIG. 3 is a fanciful representation, based on numerical modelling, showing the temperature distributions or isotherms resulting when a typical prior art electrode is used for soil heating and when the present electrode is used. A comparison between the two results is provided to point out the advantages of the present process.

The net benefit of using this injection electrode design can be observed in FIG. 3. This figure compares the temperature response in the soil from a typical prior art electrode that is uniformly cooled along the entire length and all of the cooling water is returned to surface, with an injection electrode, where cooling fluid is injected at the ends of the electrode, some of the fluids flow into the soil, and the remaining fluid returns to surface. In this example the power is controlled so that the maximum temperature is 120° C. and the total injected fluid rate is 0.5 gpm. In the present injection electrode, 0.25 gpm flows into the soil. FIG. 3 shows that input power and heat penetration are much improved using the present electrode.

Figure 4:
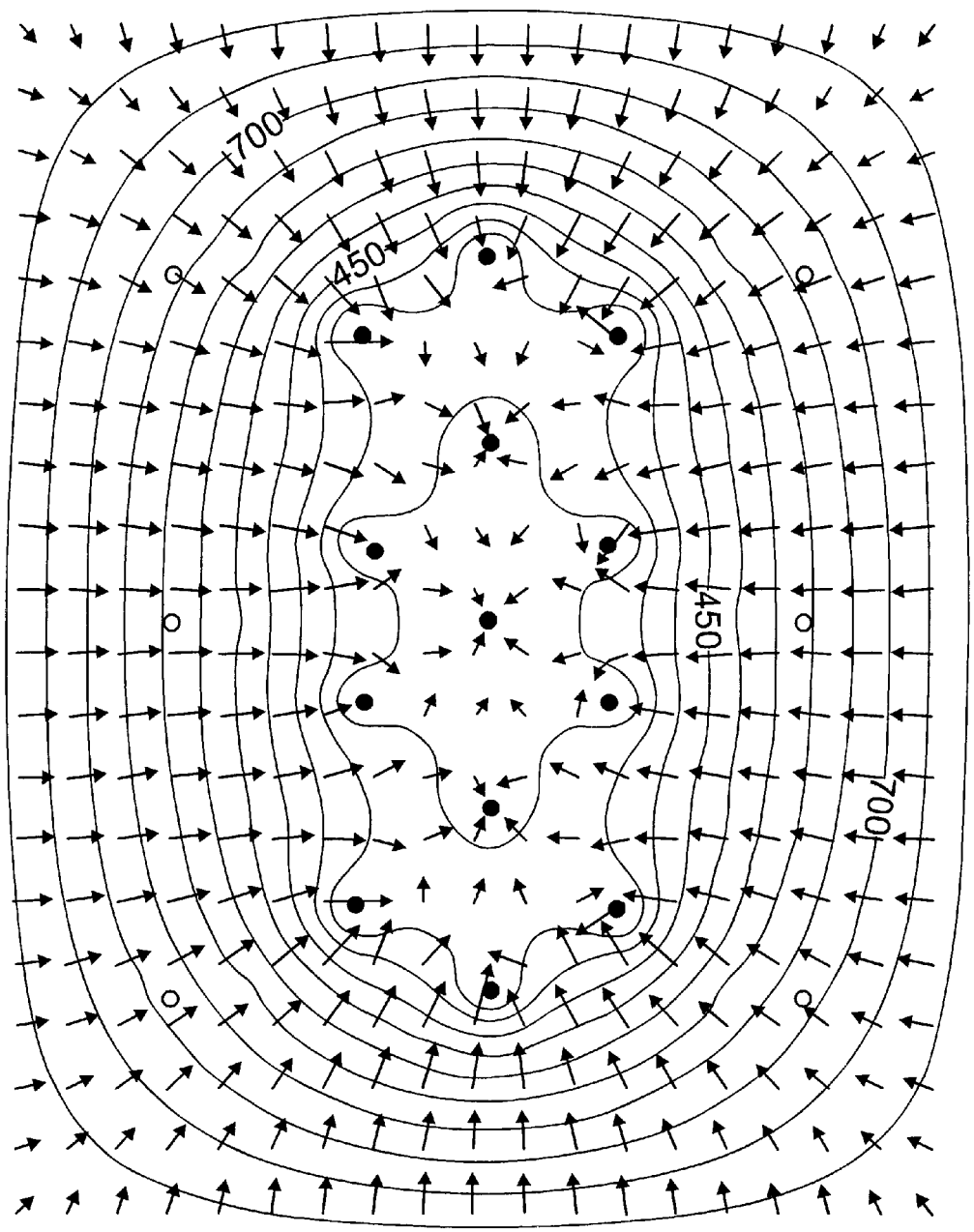
FIG. 4 is a plan diagram showing the pressure distribution with the direction and magnitude of fluid flow calculated using a numerical model for a typical operation in accordance with the present invention. The results show that the present pattern of electrode and extraction wells creates a flow distribution that is very uniform and thus results in uniform convective heat transfer and overall relatively uniform heating of the soil.
Figure 5:
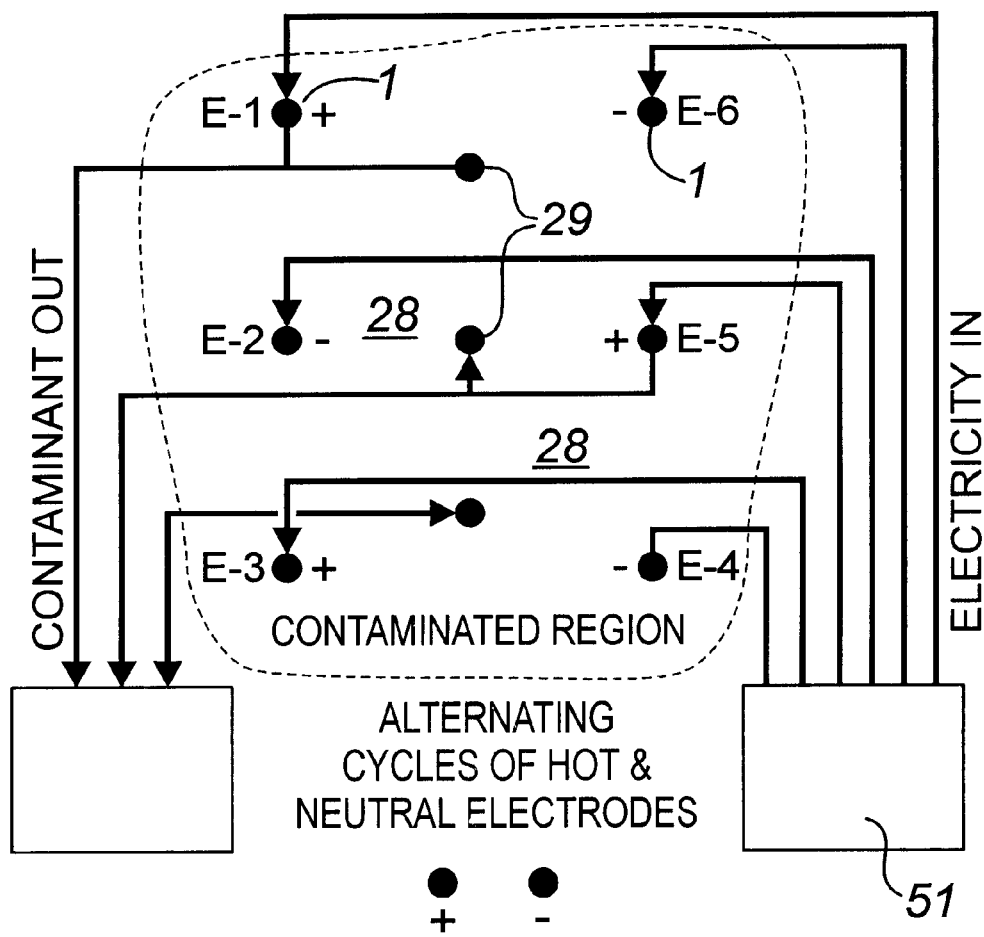
FIG. 5 is a schematic of a typical arrangement in accordance with the invention, showing electrode injection wells and soil vapour extraction wells as well as the connection of these wells to the power delivery system and the vapor recovery and water handling system.
Figure 11:
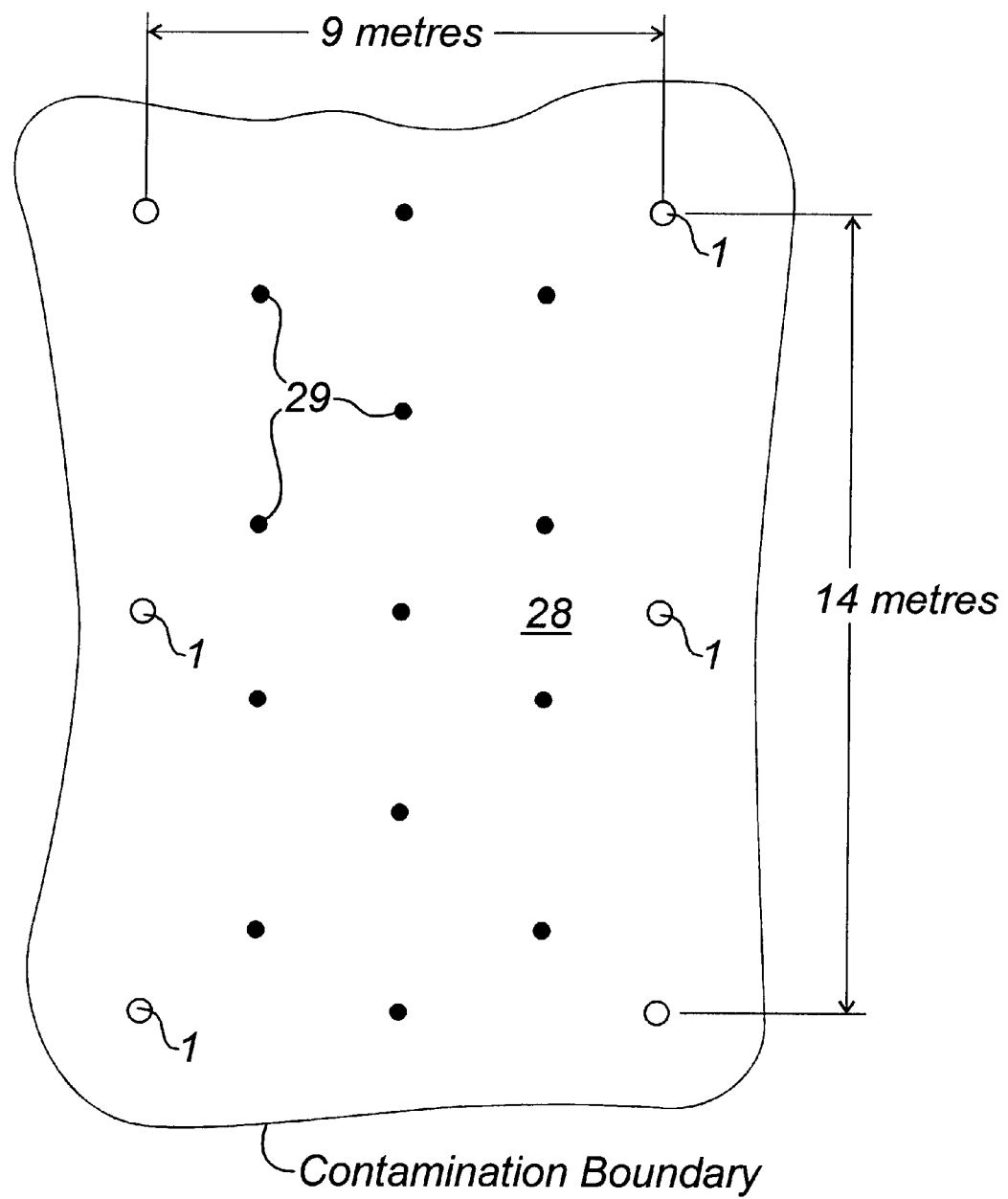
FIG. 11 is a schematic showing an example of a pattern of electrode wells and vapor extraction wells used in the present process system. This pattern was used in a numerical simulation of the process.
Figure 12:
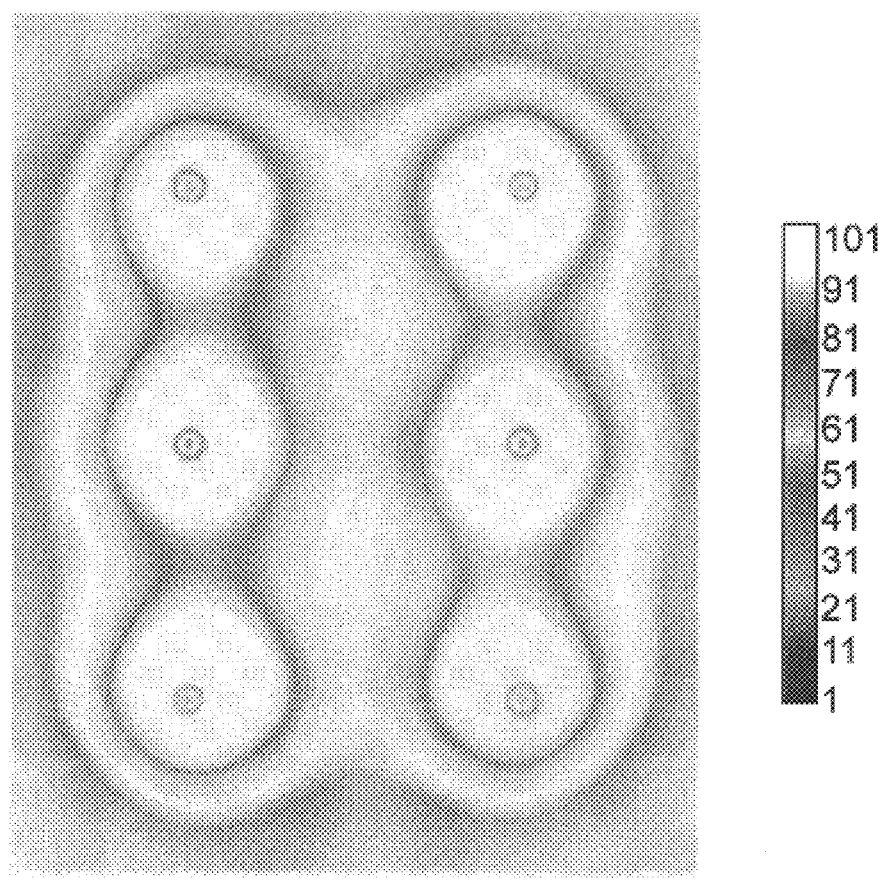
FIG. 12 is an isotherm plot developed by numerical modelling, showing the temperature distribution that results from the present process after 90 days of heating at an average input power of 110 kW.
Figure 13:
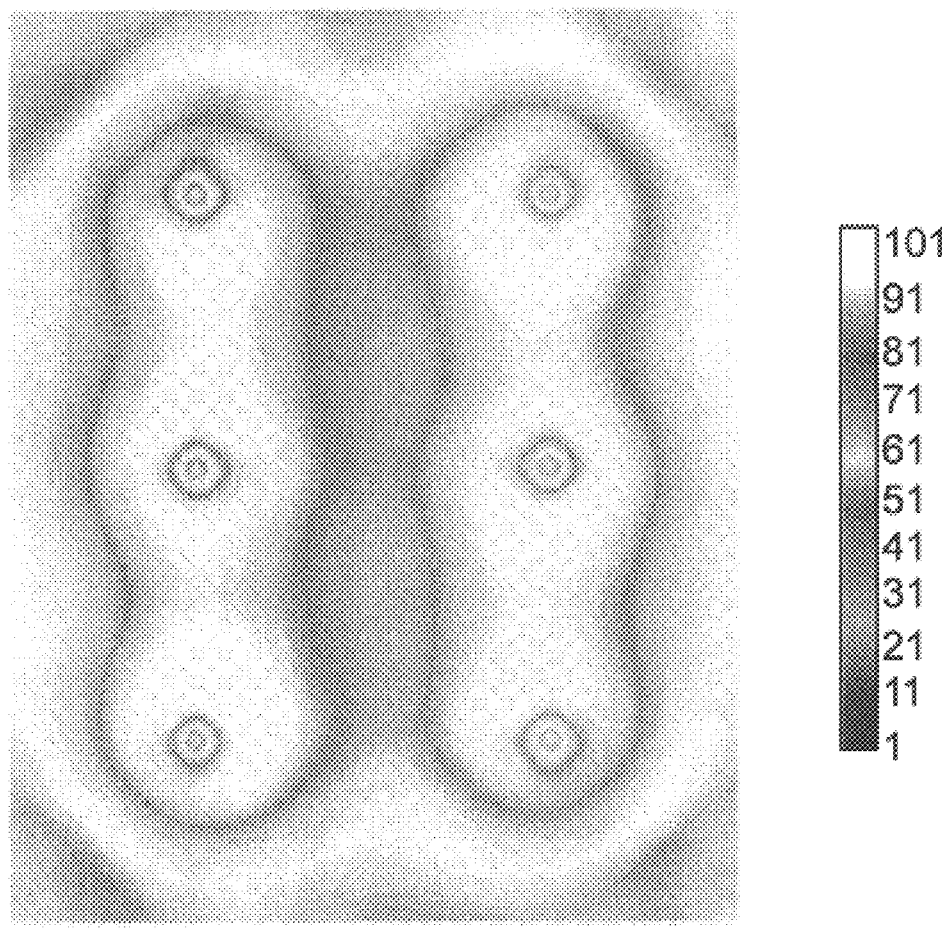
FIG. 13 is an isotherm plot, developed by numerical modelling, showing the temperature distribution in the middle of the contaminated soil that results from the present process after 120 days of heating at an average input power of 110 kW.
Figure 14:
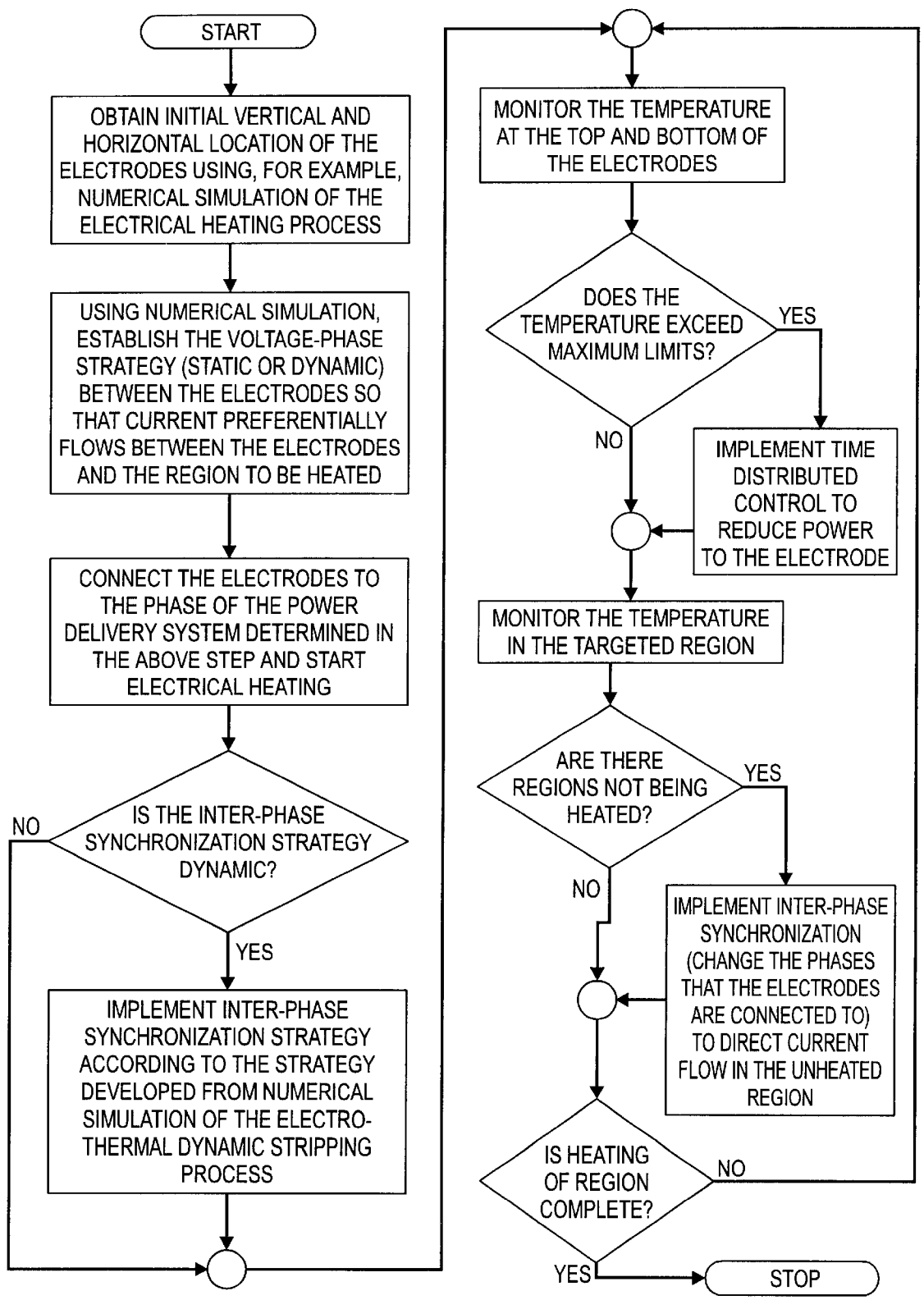
FIG. 14 is a flow chart of the process and software steps.

The pattern of electrode and extraction wells in the present process is sufficiently flexible that the pattern can be adapted to the shape of most contaminated soils and the number of electrodes and extraction wells of a pattern can be increased incrementally. This flexibility primarily arises from two unique aspects of the present process. In the first aspect, the uniformity of heating does not rely on an electrode array that is designed to produce a uniform electrical power density distribution in the soil, as for example reported in U.S. Pat. No. 5,330,297 (Heath et, al.) and U.S. Pat. No. 5,449,251 (Buettner). In the present process, uniform heating is achieved by utilizing convection, which is inherently more uniform than electrical heating. With this approach to heating, it is desirable to establish pressure gradients between the electrode wells, where fluids are injected and hence are sources of pressure, and the extraction wells, where the fluids and vapors are produced, and hence are pressure sinks. Therefore the relative position of an electrode and extraction well within a pattern of wells is such that the pressure gradients established between these wells results in preferential heating of the soil and the contaminants that are vaporized or mobilized within the heated soil flow towards the extraction wells and are recovered. Additionally, numerical simulation of the present process suggests that row and column spacing of electrode and extraction wells, such as shown in FIG. 4 (and FIG. 11), results in the most uniform flow distribution and therefore uniform heat transfer by convection. It is noted that in FIG. 4 there are 13 extraction wells, which is much more than necessary to achieve a similar result. However, for this particular application, the contamination was in very tight clay and hence the radius of influence from the extraction wells was small and therefore several extraction wells were used.

Electrode Well

Two variants of the electrode well 1 are shown in FIGS. 7a and 7b. In the former case, the well 1 has only two sets of slots or apertures. In addition, the well 1 extends above ground surface 2. In the latter case, the well 1 has three sets of slots and is buried.

Each of the two variant electrode wells 1 is designed to serve two purposes: it is the means by which electric power is conducted to the contaminated soil 3 and it provides for the injection of water into the soil for heat convection and for the circulation of water for electrode cooling.

The FIG. 7a variant will be described first.

The electrode well 1 is positioned in a wellbore 13 penetrating the contaminated soil 3.

Starting from the bottom, the electrode well 1 of FIG. 7a comprises an electrode 4. Typically the electrode 4 is a length of 8 inch diameter steel casing The side wall 5 of the electrode 4 has been slotted with a laser cutter at the top and bottom to form openings or slots 6, 8 respectively.

The width of the slots 6, 8 is chosen to be less than half the mean average diameter of the granular graphite 9 forming an electrically conductive and high permeability pack 10 outside the electrode 4.

The graphite pack 10 fills the annular space 11 between the electrode 4 and the wall 12 of the wellbore 13. As shown, the pack 10 extends up to the top of the electrode. A bentonite clay seat 40 seals the top of the pack 10. Back fill 41 extends up to ground surface 2 from the seal 40.

The graphite pack 10 functions to improve the electrical contact between the electrode 4 and the soil 3. It also provides a flow path for fluids to enter and circulate for more effective cooling of the electrode 4.

The electrode 4 is connected at its upper end by a tubular electrical isolation crossover 14 with a length of tubular isolation casing 15. These three members together form a tubular unit 16 having an internal bore 17.

Injection tubing 18 extends down through the unit bore 17 and forms an annulus 19 with the unit side wall 20. The open bottom end of the injection tubing 18 is located adjacent the bottom slots 8. At its upper end, the injection tubing 18 is connected with a source (not shown) of pumped water. Just above the bottom slots 8, the injection tubing 18 carries a packer 21. The packer 21 has a friction fit with the electrode side wall 5 and functions to seal the lower end 22 of the annulus 19 from its upper end 23.

Thus water (indicated by the arrow 30), pumped down through the bore 24 of the injection tubing 18, is caused to pass through the bottom slots 8 into the graphite pack 16 and soil 3. A first part of this water circulates as illustrated by the arrows 25, it moves through the graphite pack 10 and immediately adjacent soil 3 and re-enters the annulus 19 through the top slots 6. The circulated water cools the electrode 4, most importantly at its ends, where the electric field is most intense near the electrode and where overheating is likely to occur. The returned water is produced through the annulus 19 and leaves through a port 26 at the upper end of the isolation casing 15. A second part of the water, indicated by the arrows 27 flows radially out into the region 28 of soil 3. This second part of water picks up heat from the hot pack 10 and soil 3 adjacent the electrode 4. The so heated water migrates toward the low pressure sinks created by the extraction wells 29 and transfers heat by convection to cool soil 3 out in the further reaches of soil region 28.

A valve (not shown) is connected with the water return port 26 to throttle the water returned and increase the proportion of the water injected out into the soil 3.

A centralizer 31 is mounted on the injection tubing 18 for centralizing the tubing 18 within the unit 16. The centralizer 31 has vertical openings 32 so that fluid may move through them.

A conductor power cable 33 is connected with a source of electrical power. The power cable 33 extends down through the annulus 19 and is attached with the electrode side wall 5 by a brazen-welded electrical connection 34 using copper. The cable 33 is connected to a phase or neutral (selected by the computer controller 50) of the power delivery system 51.

Electrically isolating top and bottom end caps 35, 36 close off the ends of the tubular unit 16.

The lower end cap 36 functions to reduce or eliminate the flow of end current downwards and away from the contaminated soil 3. Current will preferentially flow from the ends of the electrode 4 and can cause overheating. Since the electrical resistance of soil will decrease as temperature increases, the relative amount of current flow from the ends of the electrode will consequently increase. The bottom end currents can increase to as much as 30% of the total current flow from the electrode. The electrically isolating end cap 36 ameliorates this problem.

The second variant electrode well 1 is shown in FIG. 7b. The same numerals are used to designate the components common to the two variants.

The electrode 4 of the FIG. 7b variant has top, middle and bottom slots 6, 7, 8. It is closed at its ends by top and bottom end caps 35, 36. These end caps 35, 36 are formed of electrical isolating material, such as polyvinyl chloride. The electrode well 1 further has three strings of tubing 18, 42, 43 extending into the electrode bore 44. The electrode bore 44 has bottom, middle and top portions 45, 46, 47. The bottom tubing 18 is landed in the lower bore portion 45 adjacent the bottom slots 8 and functions as a water injection conduit.

The tubing 42 is landed in the middle bore portion 46 adjacent the middle slots 7 and functions as a water return conduit. And the tubing 43 is landed in the top bore portion 47 adjacent the top slots 6 and functions as a water injection conduit. A lower packer 21 isolates the bottom bore portion 45 from the middle bore portion 46. An upper packer 48 isolates the middle bore portion 46 from the top bore portion 47. The bottom and top tubing 18, 43 are connected with a source (not shown) of pumped water. The middle tubing 42 is connected with a water return facility (not shown).

In this variant, water is injected through the bottom and top slots 8, 6 and part of it is returned through the middle slots 7, as illustrated by arrows 49. A valve (not shown) is connected with the tubing 42 to throttle and control the proportion of water returned.

As previously stated, the electrode 4 is positioned in a wellbore 13. This wellbore typically has a diameter of 11 inches. The electrode 4 is placed concentrically in the wellbore 13. Granular graphite 9 is packed around the electrode 4. The graphite 9 helps reduce the intensity of electrical heating at the surface of the electrode 4, effectively increases the diameter of the electrode to improve the uniformity of heating and provides a permeable return path for the cooling water. The bentonite clay seal 40 is packed above the graphite 9. The seal 40 functions to prevent water flowing to surface between the electrode 4 and the wellbore 13. If the wellbore 13 is not deep, the bentonite seal 40 can extend to ground surface 2. Alternatively, to reduce cost, back fill can be used to complete filling annulus 11. The length of the electrode well 1 is determined by the height of the contaminated soil region 28. The diameter of the wellbore 13 and electrode 4 are maximized to reduce the current density and allow for higher currents.

Water Supply

Water is supplied to the electrode well 1 by a pump and line system (not shown). Experience has shown that water supply rates of 0.5 to 1.0 gallons per minute are normally adequate to cool the electrode and create significant heat transfer into the soil 3 by convection.

Extraction Well

The vapor extraction well 29 involves a length of casing 52 positioned in a wellbore 53 penetrating the bed or region 28 of contaminated soil 3. The portion 54 of casing 52 extending across the region 28 is slotted to provide top and bottom slots 55, 56. The annulus 57 between the wellbore wall 58 and casing 52 is filled with a high permeability gravel pack 59 extending through the region 28, topped with a bentonite clay seal 60 and back fill 61.

The vapor extraction system (not shown) is attached to the vapor extraction port 62 via a hose or pipe (not shown). The vapor extraction system applies a vacuum to the extraction well casing 52 to draw out and remove the contaminants remediated from the region of soil 28. The vacuum applied to the extraction well casing 52 is in the order of ½ to ⅓ of an atmosphere.

Time Distributed Control/Inter-Phase Synchronization

The TDC-IPS system 74 is comprised of the mains power transformer 64, the computer controller 63, the AC power input cables 65, the TDC module 67, the inter-connect power cables 69, the IPS module 70, the TDC computer control cable 72, the IPS computer control cable 73, the power cables 33 and the neutral return cable 66.

The TDC module 67 comprises a plurality of single-phase, zero-cross SCR modules ("SCR modules") 68. In the preferred embodiment, there are six SCR modules 68 contained in the TDC module 67.

The IPS module 70 comprises a plurality of AC power connection devices ("connection devices") 75. The connection devices 75 may be mechanical switches (not shown). In another embodiment of the IPS module 70, the connection devices 75 may be contactors (not shown). In a further embodiment of the IPS module 70, the connection devices 75 may be single-phase, zero-cross SCR modules (not shown). In yet another embodiment of the IPS module 70, the connection devices 75 may be a manually operated patchbay (not shown) consisting of power connectors (not shown) and patch cables (not shown) permitting the manual connection of any input to any output within the IPS module 70.

Three-phase AC power is supplied by the mains power transformer 64 to the TDC module 67 through the AC input power cables 65. There is an AC input power cable 65 for each of the three phases of power from the mains power transformer 64 to the TDC module 67. Each AC power cable 65 is connected to the input of two SCR modules 68 in the TDC module 67 such that there are 6 SCR modules 68 in total in the TDC module 67.

The SCR modules 68 are turned on and off by electrical signals supplied by the computer controller 63 through the TDC computer control cable 72. The SCR modules 68 in combination with the computer controller 63 and the TDC computer control cable 72 control the average power supplied to an individual electrode 4. The SCR modules 68 are turned on or off when the voltage of the 60 Hertz power applied to the input of a SCR module 68 is at zero volts within its cycle. In a series of voltage cycles applied to the input of a SCR module 68, individual cycles of voltage may be passed through or blocked by the SCR module 68 depending on the electrical signal supplied to the SCR module 68 by the computer controller 63. The average power supplied to an electrode 4 is dependent on the proportion of voltage cycles permitted to pass through the SCR module 68 to the electrode 4 over an interval of voltage cycles as controlled by the computer controller 63.

The output of each SCR module 68 in the TDC module 67 is connected to a connection device 75 in the IPS module 70 through inter-connect power cables 69. The connection devices 75 are turned on or off by electrical signals supplied by the computer controller 63 through the IPS computer control cable 73. The connection devices 75 in combination with the computer controller 63 and the IPS computer control cable 73 control the phase of power supplied to an individual electrode 4. In the embodiment of the IPS module 70 in which the connection device 75 is a manual connection, the computer controller 63 does not send electrical signals to the connection devices 75 and there is no requirement for the IPS computer control cable 73. The purpose of the IPS module 70 is to permit the reconfiguration of the phases of power applied to the electrodes 4 in the region of soil 28, as required, to uniformly heat the region of soil 28.

The output of a connection device 75 is connected to an electrode 4 through a power cable 33. At least one of the electrodes 4 placed in the region of soil 28 is connected to a neutral return power cable 66 which is connected to the neutral connection (not shown) on the mains power transformer 64.

In the preferred mode of operation of the present invention, three-phase AC power from the mains power transformer 64 is supplied to the inputs of the SCR modules 68 in the TDC module 67 through the AC input power cables 65. The computer controller 63 controls the average power to an individual electrode 4 by controlling the proportion of voltage cycles to pass through the SCR module 68 supplying power to the individual electrode 4.

The output of each SCR module 68 in the TDC module 67 is connected to a connection device 75 in the IPS module 73 through a inter-connect power cable 69. The connection devices 75 permit the connection of power from any SCR module 68 to any electrode 4. The computer controller 63 can reconfigure the phase of power applied to an individual electrode 4 by selecting which connection device 75 to turn on or turn off. The computer controller 63 determines the average power and the phase of power to be applied to individual electrodes 4 to achieve uniform heating throughout the region of soil 28.

The embodiments of invention in which an exclusive property or privilege is claimed are defined as follows:

1. An electrode well for penetrating from ground surface into contaminated soil and enabling simultaneous introduction of multi-phase alternating current into the soil, injection of water into the soil and circulation of water into the soil and back through the well to ground surface, comprising:
    a tubular conductive electrode having a side wall, forming intervals of apertures at the top, middle and bottom of the electrode, and an internal longitudinal bore comprising top, middle and bottom portions;
    a first pump and conduit means extending into the top portion of the bore, for supplying water under pressure to the top apertures;
    a second pump and conduit means extending into the lower portion of the bore, for supplying water under pressure to the bottom apertures;
    third conduit means, extending into the middle portion of the bore, for returning water entering through the middle apertures to ground surface;
    means for sealing the bore top portion from the middle portion;
    means for sealing the bore middle portion from the bottom portion; and
    means for delivering multi-phase alternating electric current to the electrode.

2. The electrode well as set forth in claim 1, comprising: electrically insolated end caps at each end of the electrode.

3. A method for heating contaminated soil beneath ground surface and removing contaminants from contaminated soil, comprising:
    providing spaced apart, tubular electrode wells having electrodes penetrating the soil and defining a region of soil extending between the electrodes;
    providing vacuum extraction wells penetrating the region of soil and creating low pressure sinks;
    each electrode having a longitudinal bore and a side wall forming apertures extending through the side wall over intervals at the top, middle and bottom of the electrode;
    each electrode well being connected with pump means and having internal conduit means for conveying water from ground surface through the electrode bore and injecting it under pressure into the region of soil through the top and bottom apertures;
    each electrode well comprising internal conduit means for returning water to ground surface from the middle apertures;
    applying multi-phase alternating current to the electrodes to heat soil in the region;
    simultaneously pumping and conveying water from ground surface into each electrode bore and injecting it under pressure into the region of soil through the top and bottom apertures to establish a pressure gradient between the electrode well and an extraction well;
    returning some of the injected water through the middle apertures and return conduit means to ground surface;
    whereby the electrode and immediately surrounding soil at the ends of the electrode are cooled by the circulation of water and part of the water is heated and conveys heat by convection further into the region of soil toward the nearest extraction well;
    so that at least part of the region of soil is heated.

4. The method as set forth in claim 3 comprising:
    heating the region of soil sufficiently to vaporize contained contaminants; and
    withdrawing vaporized contaminants through the extraction wells.

5. A method for heating soil beneath ground surface, comprising:
    providing spaced apart electrode wells having electrodes penetrating the soil and defining a region of soil, to be heated, extending between the electrodes;
    providing vacuum extraction wells penetrating the region of soil and creating low pressure sinks;
    applying multi-phase alternating current to the electrodes to heat soil in the region;
    injecting water under pressure into the soil at the electrodes to establish a pressure gradient between the electrodes and the extraction wells, so that water that is heated electrically is forced to flow toward the low pressure sinks and thereby conveys heat by convection further into the region.

6. The method as set forth in claim 5 wherein the water is injected into the soil at the top and bottom ends of each electrode, where current density is concentrated.

7. The method as set forth in claim 6 wherein:
    each electrode is tubular and has openings at its top, bottom and middle, and each electrode well has means for injecting water through the top and bottom openings and means for returning water to ground surface from the middling openings; and
    comprising:
    injecting the water through the top and bottom openings; and
    returning part of the injected water to ground surface through the middle openings whereby the electrode is cooled by circulation of water along its exterior surface.

8. The method as set forth in claim 7 comprising:
    controlling the rate at which injected water is returned through the middle openings.

9. A method for the application of three-phase, power-line frequency electricity to electrodes used in heating soil, comprising:
    placing a plurality of temperature sensors within the soil and connecting the sensors with a computer-based electrical power controller, for measuring the temperature of the soil;
    routing the electricity to the electrodes through an electrical power delivery system that applies the electricity to the electrodes in a specific sequence as determined by the computer-based electrical power controller responsive to the temperature measurements; and adjusting the phase and average voltage of the electricity applied to the electrodes as determined by the computer-based electrical power controller to substantially uniformly heat the contaminated soil.

10. The method as set forth in claim 3, 4, 9, 5, 6, 7 or 8 comprising:

controlling the phase of alternating current applied to individual electrodes over intervals of time to cause current to flow into less conductive portions of the region of soil.

11. The method as set forth in claim 3, 4, 9, 5, 6, 7, or 8 comprising:

controlling the power applied to each electrode by varying the number of voltage cycles of the alternating current that are applied to each electrode over an interval of time.

12. The method as set forth in claim 3, 4, 9, 5, 6, 7, or 8 comprising:

controlling the phase of alternating current applied to individual electrodes over intervals of time to cause current to flow into less conductive portions of the region of soil; and controlling the power applied to each electrode by varying the number of voltage cycles of the alternating current that are applied to each electrode over an interval of time.

13. The method as set forth in claim 3, 4, 9, 5, 6, 7, or 8 wherein each electrode well has a plurality of vertically stacked electrodes; and further comprising controlling the phase of alternating current applied to individual electrodes over intervals of time to cause current to flow into less conductive portions of the region of soil.

14. The method as set forth in claim 3, 4, 9, 5, 6, 7, or 8 wherein each electrode well has a plurality of vertically stacked electrodes; and further comprising:

controlling the power applied to each electrode by varying the number of voltage cycles of the alternating current that are applied to each electrode over an interval of time.

15. The method as set forth in claim 3, 4, 9, 5, 6, 7, or 8 wherein each electrode well has at least two vertically stacked electrodes positioned opposite a corresponding number of zones in the soil penetrated, which zones have different electrical resistance; and comprising:

controlling the phase of alternating current applied to individual electrodes over intervals of time, and controlling the power applied to each electrode by varying the number of voltage cycles of the alternating current that are applied to each electrode over an interval of time, so as to vary voltage gradients between an electrode positioned opposite one zone and an electrode, in another electrode well, positioned opposite another zone.

16. A method for heating contaminated soil beneath ground surface and removing contaminants from the soil, comprising:

providing spaced apart electrode wells having electrodes penetrating the soil and defining a region of soil, to be heated, extending between the electrodes;

providing vacuum extraction wells penetrating the region of soil and creating low pressure sinks;

applying multi-phase alternating current to the electrodes to heat soil in the region;

injecting water under pressure into the soil at the electrodes to establish a pressure gradient between the electrodes and the extraction wells, so that water that is heated electrically is forced to flow toward the low pressure sinks and thereby conveys heat by convection further into the region;

whereby at least part of the region is heated sufficiently to vaporize contained contaminants; and withdrawing vaporized contaminants through the extraction wells.

17. The method as set forth in claim 16 wherein the water is injected into the soil at the top and bottom ends of each electrode, where current density is concentrated.

18. The method as set forth in claim 17 wherein:

each electrode is tubular and has openings at its top, bottom and middle, and each electrode well has means for injecting water through the top and bottom openings and means for returning water to ground surface from the middling openings; and comprising:

injecting the water through the top and bottom openings; and returning part of the injected water to ground surface through the middle openings whereby the electrode is cooled by circulation of water along its exterior surface.

19. The method as set forth in claim 18 comprising:

controlling the rate at which injected water is returned through the middle openings.

20. The method as set forth in claim 16, 17, 18 or 19 comprising:

controlling the phase of alternating current applied to individual electrodes over intervals of time to cause current to flow into less conductive portions of the region of soil.

21. The method as set forth in claim 16, 17, 18 or 19 comprising:

controlling the power applied to each electrode by varying the number of voltage cycles of the alternating current that are applied to each electrode over an interval of time.

22. The method as set forth in claim 16, 17, 18 or 19 comprising:

controlling the phase of alternating current applied to individual electrodes over intervals of time to cause current to flow into less conductive portions of the region of soil; and controlling the power applied to each electrode by varying the number of voltage cycles of the alternating current that are applied to each electrode over an interval of time.

23. The method as set forth in claim 16, 17, 18 or 19 wherein each electrode well has a plurality of vertically stacked electrodes; and further comprising controlling the phase of alternating current applied to individual electrodes over intervals of time to cause current to flow into less conductive portions of the region of soil.

24. The method as set forth in claim 16, 17, 18 or 19 wherein each electrode well has a plurality of vertically stacked electrodes; and further comprising:

controlling the power applied to each electrode by varying the number of voltage cycles of the alternating current that are applied to each electrode over an interval of time.

25. The method as set forth in claim 16, 17, 18 or 19 wherein each electrode well has at least two vertically stacked electrodes positioned opposite a corresponding number of zones in the soil penetrated, which zones have different electrical resistance; and comprising:

controlling the phase of alternating curves applied to individual electrodes over interval of time, and controlling the power applied to each electrode by varying the number of voltage cycles of the alternating current that are applied to each electrode over an interval of time, so as to vary voltage gradients between an electrode positioned opposite one zone and an electrode, in another electrode well, positioned opposite another zone.

* * * * *